Patented Feb. 25, 1936

2,031,637

UNITED STATES PATENT OFFICE 2,031,637

AZEOTROPIC DEHYDRATION OF AQUEOUS MIXTURES OF LOWER ALIPHATIC ACIDS AND ANHYDRIDES

Henry Dreyfus, London, England

No Drawing. Application May 25, 1933, Serial No. 672,803. In Great Britain June 6, 1932

18 Claims. (Cl. 202—42)

This invention relates to improvements in concentrating and is more particularly concerned with the concentration of aqueous solutions or dilutions of organic liquids.

I have discovered that ethylidene chloride is a highly efficient agent for separating water from organic liquids and particularly for separations in which the water is separated in the vapour phase. Thus it appears that ethylidene chloride is possessed of azeotropic properties.

The most important commercial aspects of the present invention are the concentration of aqueous solutions of acetic acid and other lower aliphatic acids, for example propionic acid, and the separation of water from acetic anhydride or other aliphatic acid anhydrides, for example the separation of water from the reaction gases obtained in the pyrogenic decomposition of vapours of aliphatic acids, which as is known is usually carried out at relatively high temperatures, for example 500–900° C., and with or without catalysts. Both these operations are of considerable commercial importance and much research has been carried out with a view to obtaining efficient separation of the water from the acid or from the anhydride. In the case of concentrating acids, and particularly acetic acid, considerable difficulties have been encountered in reaching in a simple and inexpensive operation high concentrations, for example concentrations of the order of 90–100%, while in the case of separation of anhydrides, and especially acetic anhydride, from water quick and easy separation of the water is essential owing to the possibility of hydrolysis of the anhydride with resultant loss in efficiency. Ethylidene chloride presents considerable advantages in such separations and may be used in the separation of water from organic liquids generally.

The ethylidene chloride may be used in a number of ways. In the concentration of acetic acid or other lower aliphatic acids it may be used to extract the acid from the aqueous solution, preferably by the counter-current method, and with the reagents either both in the liquid phase, both in the vapour phase, or one in the vapour phase and one in the liquid phase, and the resulting extract may be distilled to recover the ethylidene chloride and leave behind the acetic acid or other lower aliphatic acid, the ethylidene chloride being capable of removing the relatively small amount of water which is contained in the extract as an azeotropic mixture. Liquid ethylidene chloride may for example be supplied to the top of a column, and the aqueous acetic acid be supplied to the lower portion, both preferably by a rose or other distributing device, and the ethylidene chloride be allowed to sink through the dilute solution of acetic acid so as to extract the acetic acid, the water layer floating to the top and being drawn off by any suitable means.

In a further method the ethylidene chloride may be used to remove the whole of the water as an azeotropic mixture. In this method the aqueous solution of acetic acid may be mixed with ethylidene chloride and the whole subjected to distillation in a suitable column apparatus, the vapours of ethylidene chloride and water being condensed, and the ethylidene chloride layer being returned if necessary to the still so as to remove more water. By this means a small quantity of ethylidene chloride may be employed for the removal of large quantities of water.

The acetic acid to be concentrated according to the processes described above may be a comparatively dilute acetic acid, for example of 10–15 up to 30% strength or the process may be used to effect a final concentration, for example from 70–95% or more. It may for instance be advantageous to effect a preliminary concentration of an acetic acid of 25–30% resulting for example from the acetylation of cellulose or other acetylation processes up to about 70% by extraction methods, for example with ether or a mixture of petrol ether and ether or with any other suitable extracting agent and then to effect a final concentration with the aid of ethylidene chloride according to the present invention. However, the present invention is not limited to any particular concentration of acetic acid as the starting material, nor is it limited to the degree of concentration to which the acetic acid is carried.

In a similar manner ethylidene chloride may be used to separate the water from the reaction products in the pyrogenic decomposition of acetic acid in a number of ways. For example ethylidene chloride may be injected into the reaction vapours from the pyrogenic decomposition and the injection may take place in such quantities and with or without additional cooling that the whole of the condensible vapours are condensed together with the ethylidene chloride. In such a case the condensate usually separates into two layers, the one layer comprising in general a solution of the anhydride and the acid in ethylidene chloride, and the other layer consisting of water and containing a small amount of the acid. The two layers may be separated by decantation or otherwise and either in the vessel in which condensation takes place or in a separate vessel. As a second alternative liquid ethylidene chloride or vapour thereof may be injected into the reaction gases from the pyrogenic decomposition under such conditions that if not already vaporized it is vaporized therein, and the vapours of the ethylidene chloride carry off the water in vapour form, the temperature conditions being so adjusted that the anhydride and preferably the acid as well are condensed.

In another method of carrying out this particular separation by means of the present invention the mixed gases and vapours, preferably after cooling, are led below the surface of a body of ethylidene chloride which may be cooled down or otherwise kept at a temperature below its boiling point. By this means again the condensible vapours in the reaction product from the pyrogenic decomposition are condensed and separated into two layers with the acid and the anhydride in the ethylidene chloride layer and the water as a separate layer. Separation may take place as before. In this method of working the temperature conditions of the body of ethylidene chloride may be so adjusted that during the condensation of the condensible vapours the ethylidene chloride is evaporated and carries off with it water contained in the vapours. Another method of effecting separation of the water with the aid of ethylidene chloride consists in causing the reaction gases from the pyrogenic decomposition to impinge upon the surface of a stream of ethylidene chloride maintained at about or below its boiling point. Where sufficient cooling is applied little or no ethylidene chloride is vaporized and the anhydride, acid and water are condensed. Separation takes place as before into two layers and the water layer may be run off from the ethylidene chloride-anhydride layer. Here again if desired the hot reaction gases may be caused to vaporize some of the ethylidene chloride so as to carry off the whole or part of the water.

It will be noted that, in the above described methods of separating water from acetic or other lower aliphatic anhydrides, vaporous mixtures are treated and the separation takes place before, or at the moment of, condensation of the water. Such methods are preferably adopted whenever a vaporous mixture is to be treated as hydrolysis of the anhydride may thereby be minimized. The invention is not, however, limited in this respect and may be applied to the separation of acetic or other lower aliphatic anhydrides from liquid aqueous mixtures by extraction of the anhydride with ethylidene chloride.

In any of the above methods it is found that ethylidene chloride is an extraordinarily efficient agent for separating the water. Where the water is actually condensed by the ethylidene chloride, it is preferable that very strong cooling be applied so that the water is brought rapidly down from the temperature of the reaction gases to normal atmospheric temperature. Where the water is carried off by the ethylidene chloride in the form of vapour, it is desirable that the water at no stage of the treatment be brought down to a temperature such that condensation thereof occurs. Cooling of the reaction vapours prior to treatment with the ethylidene chloride may in all cases be resorted to, though preferably not to below the 100° C. By this means hydrolysis of the anhydride is reduced to a minimum.

The ethylidene chloride may be used for the purpose of the present invention either alone or mixed with other agents which may be diluents or which may themselves have the effect of assisting the separation of water from the anhydride, for instance liquids which are insoluble or substantially insoluble in water and which are preferably solvents for the anhydride and also for the acid corresponding to the anhydride, for example petroleum hydrocarbons, such as light paraffins, gasoline or kerosene, ethers, or mixtures of ethers with petroleum hydrocarbons, for instance ether mixed with petroleum ether, benzene, or homologues of benzene.

The following examples illustrate the removal of water from aqueous acetic acid and from a vaporous mixture such as is obtained in the manufacture of acetic anhydride by thermal decomposition of acetic acid, but it is to be understood that these examples are given solely by way of illustration and that the invention is in no way limited thereto.

*Example 1*

Aqueous acetic acid of about 30–50% concentration is distilled with ethylidene chloride. The operation is carried out in a column still into which the dilute acid is fed, ethylidene chloride being supplied near the top of the still.

Concentrated acid is withdrawn from the bottom of the still and a vapour mixture of water and ethylidene chloride from the top. The vapour mixture is passed to a condenser, the layer of ethylidene chloride separating from the water in the condensate being returned to the still for re-use.

*Example 2*

A hot vaporous mixture obtained by thermally decomposing acetic acid and containing by weight about 40 parts of acetic anhydride, 48 parts of acetic acid and 12 parts of water is fed into the lower part of a fractionating column into the upper part of which liquid ethylidene chloride is fed. The ethylidene chloride is supplied at a rate in excess of that required to carry off the water present. The lower part of the column may be heated, if desired, to minimize condensation of water with the anhydride.

The mixture of water and ethylidene chloride escaping from the top of the column is condensed, and the lower layer of ethylidene chloride which separates in the condensate returned to the process.

A solution of acetic anhydride and acetic acid in excess of ethylidene chloride collects at the bottom of the column and may be distilled free from ethylidene chloride after which the residual mixture of acetic acid and acetic anhydride may be separated by distillation into its components, or, if necessary after adjustment of the proportion of either of the components, the mixture itself may be used for acetylation, e. g. of cellulose.

What I claim and desire to secure by Letters Patent is:—

1. Process for the separation of water from admixture with organic liquids selected from the group consisting of lower aliphatic acids and lower aliphatic anhydrides which comprises removing water therefrom in the form of an azeotropic mixture with ethylidene chloride.

2. Process for the separation of water from admixture with a lower aliphatic acid which comprises removing water therefrom in the form of an azeotropic mixture with ethylidene chloride.

3. Process for the separation of water from admixture with acetic acid which comprises removing water therefrom in the form of an azeotropic mixture with ethylidene chloride.

4. Process for the separation of water from admixture with a lower aliphatic anhydride which comprises removing water therefrom in the form of an azeotropic mixture with ethylidene chloride.

5. Process for the separation of water from admixture with acetic anhydride which comprises removing water therefrom in the form of an azeotropic mixture with ethylidene chloride.

6. Process for the separation of water from vaporous mixtures comprising water and an organic liquid selected from the group consisting of lower aliphatic acids and lower aliphatic anhydrides, which comprises condensing the organic liquid while removing water in the form of an azeotropic mixture with ethylidene chloride.

7. Process for the separation of water from vaporous mixtures comprising water and a lower aliphatic acid which comprises condensing the lower aliphatic acid while removing water in the form of an azeotropic mixture with ethylidene chloride.

8. Process for the separation of water from vaporous mixtures comprising water and acetic acid which comprises condensing the acetic acid while removing water in the form of an azeotropic mixture with ethylidene chloride.

9. Process for the separation of water from vaporous mixtures comprising water and a lower aliphatic anhydride which comprises condensing the lower aliphatic anhydride while removing water in the form of an azeotropic mixture with ethylidene chloride.

10. Process for the separation of water from vaporous mixtures comprising water and acetic anhydride which comprises condensing the acetic anhydride while removing water in the form of an azeotropic mixture with ethylidene chloride.

11. Process for the separation of water from vaporous mixtures comprising water and a lower aliphatic acid, which comprises introducing vaporous ethylidene chloride into the vaporous mixture followed by condensing the lower aliphatic acid while removing water in the form of an azeotropic mixture with ethylidene chloride.

12. Process for the separation of water from vaporous mixtures comprising water and acetic acid, which comprises introducing vaporous ethylidene chloride into the vaporous mixture followed by condensing the acetic acid while removing water in the form of an azeotropic mixture with ethylidene chloride.

13. Process for the separation of water from vaporous mixtures comprising water and a lower aliphatic anhydride, which comprises introducing vaporous ethylidene chloride into the vaporous mixture followed by condensing the lower aliphatic anhydride while removing water in the form of an azeotropic mixture with ethylidene chloride.

14. Process for the separation of water from vaporous mixtures comprising water and acetic anhydride, which comprises introducing vaporous ethylidene chloride into the vaporous mixture followed by condensing the acetic anhydride while removing water in the form of an azeotropic mixture with ethylidene chloride.

15. In the manufacture of a lower aliphatic anhydride by the thermal decomposition of the corresponding acid, separating water from the vaporous products of the thermal decomposition by condensing anhydride while removing water in the form of an azeotropic mixture with ethylidene chloride.

16. In the manufacture of acetic anhydride by the thermal decomposition of acetic acid, separating water from the vaporous products of the thermal decomposition by condensing anhydride while removing water in the form of an azeotropic mixture with ethylidene chloride.

17. In the manufacture of a lower aliphatic anhydride by the thermal decomposition of the corresponding acid, separating water from the vaporous products of the thermal decomposition by introducing ethylidene chloride into said vaporous products and then condensing anhydride while removing water in the form of an azeotropic mixture with ethylidene chloride.

18. In the manufacture of acetic anhydride by the thermal decomposition of acetic acid, separating water from the vaporous products of the thermal decomposition by introducing ethylidene chloride into said vaporous products and then condensing anhydride while removing water in the form of an azeotropic mixture with ethylidene chloride.

HENRY DREYFUS.